(No Model.) 2 Sheets—Sheet 1.
C. S. BRADLEY.
ALTERNATING CURRENT MOTOR.
No. 591,268. Patented Oct. 5, 1897.
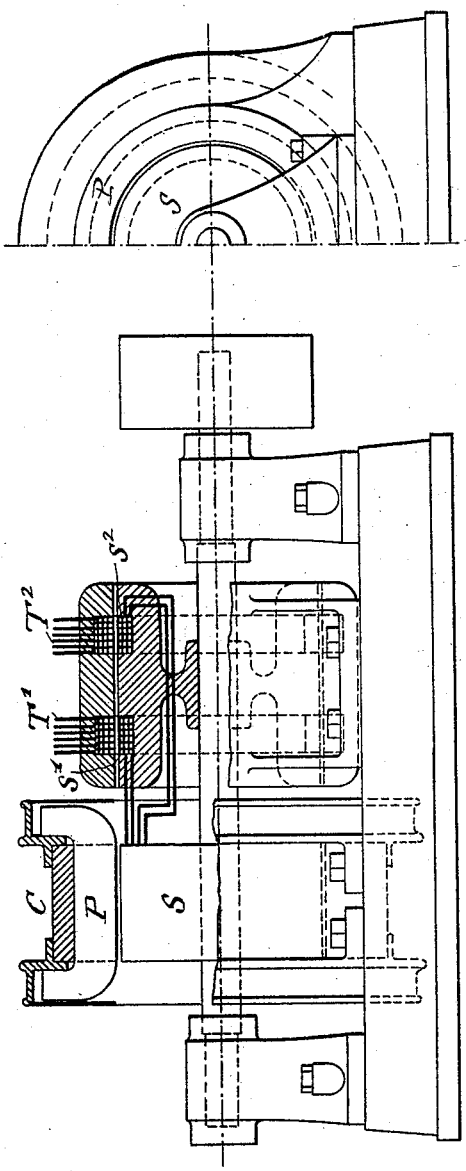
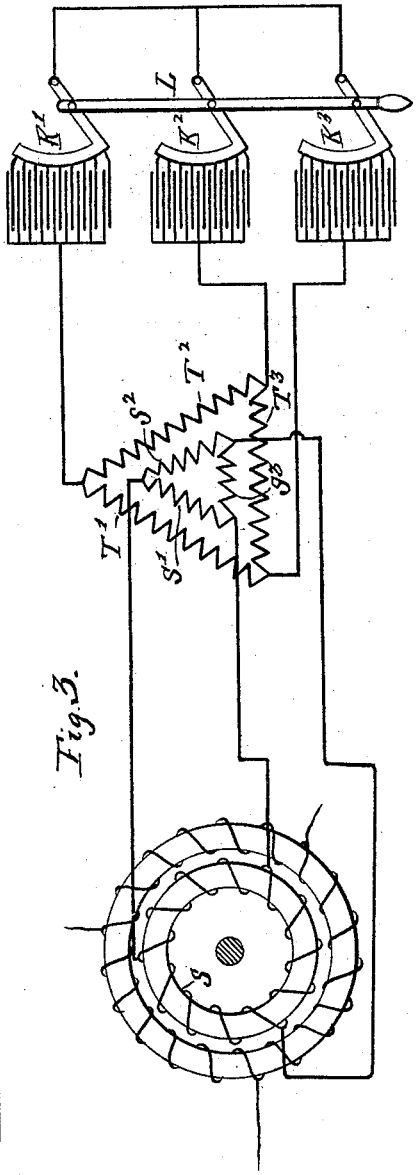
WITNESSES:
C. L. Belcher
Alick G. Macandrew
INVENTOR
Charles S. Bradley
BY
his ATTORNEY.

(No Model.) 2 Sheets—Sheet 2.
C. S. BRADLEY.
ALTERNATING CURRENT MOTOR.
No. 591,268. Patented Oct. 5, 1897.
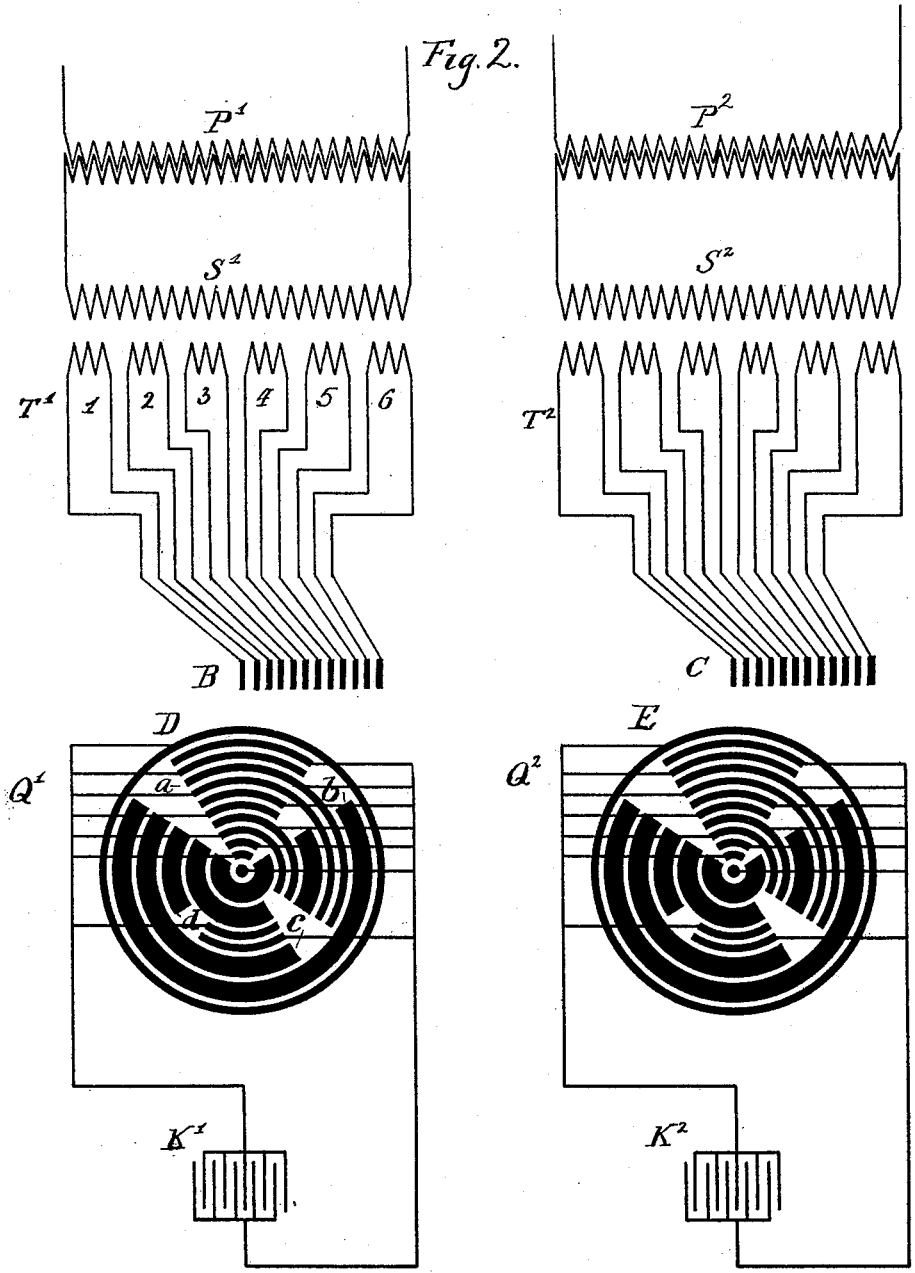
WITNESSES:
C. L. Belcher
G. H. Stockbridge
INVENTOR
Charles S. Bradley
BY Robt H Read
his ATTORNEY.

UNITED STATES PATENT OFFICE.

CHARLES S. BRADLEY, OF AVON, NEW YORK, ASSIGNOR TO THE GENERAL ELECTRIC COMPANY, OF NEW YORK.

ALTERNATING-CURRENT MOTOR.

SPECIFICATION forming part of Letters Patent No. 591,268, dated October 5, 1897.

Application filed June 22, 1896. Serial No. 596,429. (No model.)

*To all whom it may concern:*

Be it known that I, CHARLES S. BRADLEY, a citizen of the United States, and a resident of Avon, in the county of Livingston and State of New York, have invented certain new and useful Improvements in Alternating-Current Motors, of which the following is a specification.

This invention relates to alternating-current motors, the object being to improve the regulation of speed and torque and to dispense with brush-contacts.

The invention is especially applicable to motors of the induction type in which a rotary field is established in one element, preferably the fixed or stationary element, and the other element is inductively charged by the rotary field. I connect the revolving element at a plurality of points with a winding inclosing an independent core rigidly secured to the same shaft which carries the rotary element. This winding forms the primary of a transformer, the secondary of which is wound upon an annular core surrounding the primary. Thus the induced currents set up in the motor-armature act inductively upon the secondary of the transformer and deliver current to a stationary part of the apparatus. The transformer secondary is connected with an external regulating-circuit, including devices by which the capacity inductance product may be varied to vary the torque and speed of the motor. I prefer to employ adjustable condensers for this purpose, though the inductance may be varied with less convenience by making the transformer secondary sectional and coupling the sections in different relations.

It comprises also an alternating-current motor having one of its elements provided with connections with a source of current-supply and its rotary element charged inductively and reacting inductively on a stationary circuit, including devices for varying the flow of current.

It comprises also more specific features, which will be hereinafter fully described, and will be definitely indicated in the claims.

In the accompanying drawings, which illustrate the invention, Figure 1 is a sectional side elevation of a motor embodying my improvements. Fig. 1$^a$ is a partial side elevation. Fig. 2 is a diagram of one mode of regulating the speed and torque. Fig. 3 is a diagram of another mode of regulating the speed and torque.

C represents a field-magnet which is preferably provided with a rotary-field winding adapted for polyphase alternating-currents. These currents may be of any order. Fig. 2 shows at P' P$^2$ the two branches of a quarter-phase winding. Fig. 3 shows a triphase winding. When other induction-motors are connected in the same distribution-circuit, a single-phase winding may be employed. The armature S is provided with a winding preferably polyphase. (Shown as quarter-phase in Fig. 2 and triphase in Fig. 3.) The winding connects at a plurality of symmetrically-distributed points with corresponding coils S' S$^2$, wound on an annular iron core fixed to the armature-shaft and revolving with it. Surrounding the annular iron core is another core wound with a plurality of coils T' T$^2$, numbered from 1 to 6, provided, respectively, with independent terminals at B C, (see Fig. 2,) and connected with switches D E, by which they may be grouped in various relations to vary the inductance. A condenser K' K$^2$ of constant value is included in circuit with each switch. In lieu of adjusting the inductance the latter may be a constant factor, changing slightly only with changes of load, and the condenser may be variable. Such an organization is illustrated in Fig. 3, where K' K$^2$ K$^3$ are condensers included in the polyphase circuit of the transformer and provided with a controlling-switch L, by which a single movement of an operating-handle graduates all of the condensers simultaneously and similarly by cutting in or out more surface. It will be understood from the construction thus described that no brushes whatever are employed on the motor. A rotary or progressive magnetic field is set up in the element C, which inductively develops currents in the winding of the armature S and consequently delivers alternating currents differing in phase to the primary windings S' S$^2$ of the transformer. Thus electromotive forces differing in phase are developed in the coils T T'. Evidently by adjusting the switches D, E, or L the relations of capacity and inductance are varied in these circuits, which, by varying the phase differences of current and electromotive force and permitting a greater or less flow of current, graduates the speed and torque of the motor. The best condition of adjustment will be obtained when the circuits T' T² are electrically consonous—that is to say, when the inductance and capacity are so adjusted that the inductance will be neutralized. This will occur when the adjustment is such that the product of the capacity in microfarads, multiplied by the inductance in henries, equals twenty-five thousand three hundred divided by the square of the rate of alternation in the circuits T T'. The rate of alternation is a variable factor, depending on the "slip" of the armature, since evidently it depends upon the difference in speed of the armature and the rotary field. As the largest current flows when the consonous adjustment is obtained the speed of the armature may be held at any point desired by making the adjustment of the condenser or inductance such that the capacity-inductance product will be such as to produce electrical consonance for that speed. As the torque begins to fall off on departure from consonance this also may be varied by adjustment of the switches. Any suitable form of switch may be provided. That for the condenser depicted in Fig. 3 will be understood upon inspection of the drawings. That of Fig. 2 may require a brief description.

D represents a series of concentric annular segments insulated from one another and mounted upon a suitable arbor to turn as a whole. Upon these segments may bear a series of radially-disposed contacts B, corresponding in number to the number of annular segments. The switch is subdivided into four parts $a\ b\ c\ d$, which are so arranged as to connect the contacts B (which connect with coil-terminals T' T²) in different relations. Alternate segments of the group $a$ connect with opposite plates of the condenser. Let us suppose that contacts B are placed on group $a$. Each coil will then be connected with opposite sides of the condenser and the coils will be in multiple-arc relation, offering a minimum inductance. If placed on group $b$, the second and third contacts, the sixth and seventh, and the tenth and eleventh will be connected together by the broad-faced segments, thus placing the coils in three groups of two each in series. Similarly, if the contacts be placed on group $c$, the second and third, the fourth and fifth, the eighth and ninth, and the tenth and eleventh will be connected together, the other terminals connecting alternately with opposite sides of the condenser, thus connecting the coils in two groups of three each in series, and when the contacts are placed on the group $d$ all coils will be connected in series, giving a maximum inductance. In each of these adjustments a different-capacity inductance product will be given, thus changing the consonous speed of the motor. I prefer to make the condenser the adjustable factor, as shown in Fig. 3, on account of the simplicity of construction and ease of management, and although the polyphase system of connection is the most advantageous and efficient it is not absolutely essential, as a single-phase motor when once started will run under load. My invention is therefore applicable to induction-motors of all kinds.

Having thus described my invention, what I claim as new, and desire to secure by Letters Patent, is—

1. An alternating-current induction-motor having a revolving element inductively related to a rotary magnetic field and inductively related to an auxiliary stationary circuit including current-regulating devices.

2. An alternating-current induction-motor having a field-core provided with a rotary-field winding, a rotary armature electrically connected with the revolving primary coil of a transformer, and a stationary secondary coil of the transformer connected with a regulating-switch.

3. An alternating-current induction-motor having a stationary element provided with a rotary-field winding and a rotary element in fixed connection with a polyphase circuit including the primary coils of a transformer, and stationary secondary coils for the transformer including devices for regulating the capacity inductance product of the circuit including it.

4. An alternating-current induction-motor having a stationary element provided with a rotary-field winding, a rotary element connected with a primary coil wound on an annular core fixed to the rotary element, a secondary coil on a core in close inductive relation to the primary coil, and a regulating-switch in circuit with the secondary coil.

In testimony whereof I have hereunto subscribed my name this 29th day of May, A. D. 1896.

CHARLES S. BRADLEY.

Witnesses:
 ROBT. H. READ,
 A. WRIGHT CHAPMAN.